July 10, 1956  A. P. SCHELLER ET AL  2,754,395
INERT GAS SHIELDED ARC WELDING TORCH
Filed Nov 1, 1951  2 Sheets-Sheet 2
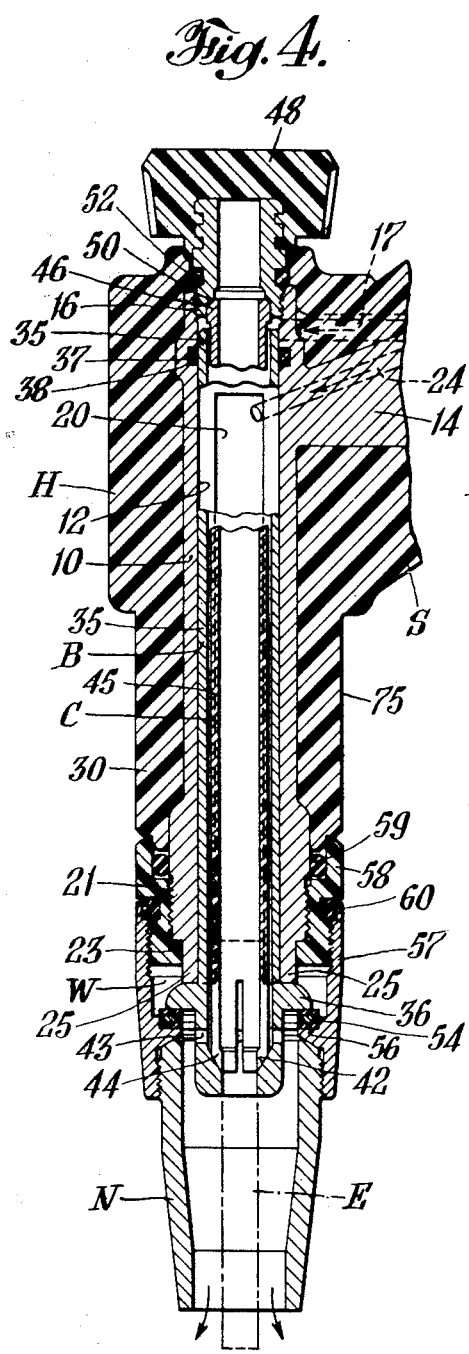
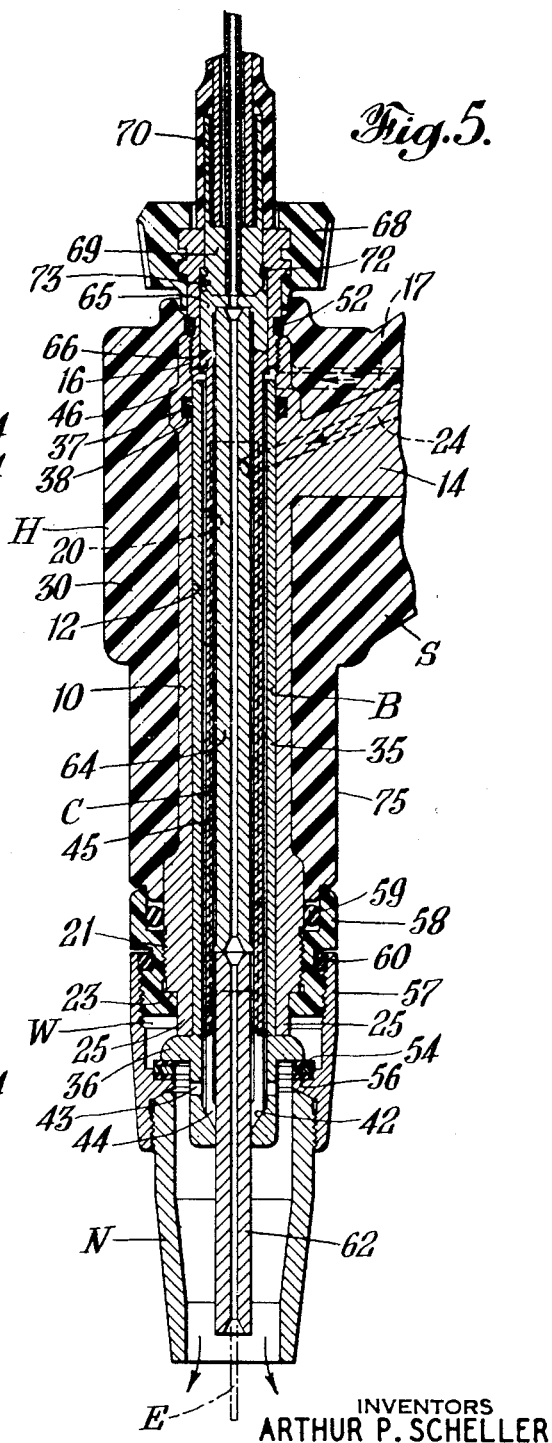
INVENTORS
ARTHUR P. SCHELLER
EDWARD R. BEHNKE
BY D.C. Harrison
ATTORNEY United States Patent Office 2,754,395
Patented July 10, 1956

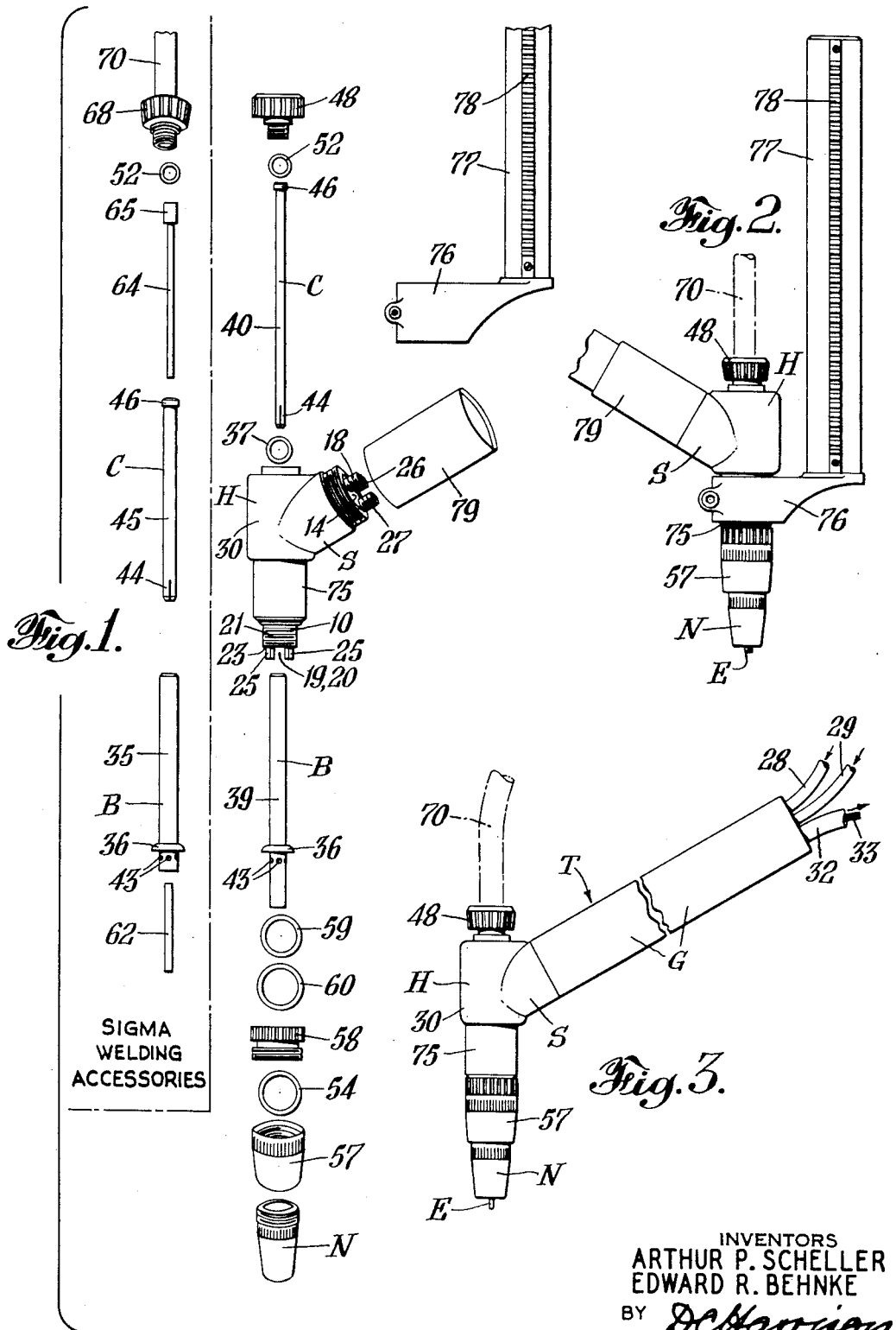

2,754,395
INERT GAS SHIELDED ARC WELDING TORCH

Arthur P. Scheller, Chatham, and Edward R. Behnke, Parsippany, N. J., assignors to Union Carbide and Carbon Corporation, a corporation of New York Application November 1, 1951, Serial No. 254,222

6 Claims. (Cl. 219—8)

This invention relates to inert gas shielded arc welding torches, and more particularly to torches of this character in which the arc is shielded by a stream of gas containing argon or helium.

For welding with a non-consumable electrode of tungsten or the like, the electrode is held in the torch by gripping means such as a collet, to maintain the electrode in fixed adjusted position. For metal-arc welding with a consumable electrode which deposits weld metal, the electrode must be fed through a guide tube which also serves as a contactor to supply welding current to the moving electrode.

For these reasons, one type of torch or gun has been employed for tungsten arc welding, and a radically different type provided for metal arc welding. Hence to convert from one process to the other, the first torch has been required to be disconnected from its supply lines for shielding gas, welding current and also generally cooling water, and an entirely different second torch has been required to be substituted and connected up to the supply lines.

It is therefore the main object of the present invention to provide a gas shielded arc welding torch or gun which can be converted from tungsten arc to metal arc welding without disconnecting the supply line connections to the torch body.

Other objects are to provide a torch having an electrode wire contactor tube which can be removed and replaced without requiring the use of a wrench, which comprises a relatively permanent portion and a readily replaceable contactor portion.

According to the present invention, the gas shielded arc welding torch comprises a hollow current and gas supplying head, an electrode holder in said head, a gas directing nozzle adjacent the lower end of said holder, said holder having a continuous gas passage from the interior of said head to the interior of said nozzle, in combination with interchangeable parts selectively cooperating with said holder for converting the torch from gripping a non-consumable electrode to guiding a metal depositing electrode wire through the torch and out through an electrode contactor inside the nozzle. The interchangeable parts preferably comprise a collet in the holder, an electrode guide tube gripped by the collet, a collet nut on the holder, and a flexible wire supplying cable coupling in the collet nut. The guide tube preferably comprises a relatively permanent portion extending above the torch water jacket, and a separable contactor tube removably mounted therebelow and extending out through the nozzle.

Other objects and features of novelty will become apparent from the following description and the accompanying drawings, in which Fig. 1 is an exploded elevation of the torch and its interchangeable parts according to the preferred embodiment of the present invention;

Fig. 2 is an assembly elevation of the torch adapted for mechanized or carriage propelled operation;

Fig. 3 is an assembly elevation of the torch adapted for hand operation;

Fig. 4 is an enlarged section of the torch assembled for holding a non-consumable electrode for tungsten or the like arc welding; and Fig. 5 is a similar section of the torch assembled for guiding a moving metal depositing electrode wire through the torch.

The torch indicated generally at T comprises a hollow current and gas supplying head H rigidly connected intermediate its ends at an oblique angle to a shank S, which may have a handle or hand grip G. Detachably connected to one end of the head H is an electrode holder B, containing a collet C coacting therewith to grip an electrode E. The head and holder are detachably sealed to form a cooling chamber W. A gas directing nozzle N is mounted adjacent the lower end of the electrode holder B, which has a continuous gas passage from the interior of the head H to the interior of the nozzle N.

As shown in Figs. 1 and 4, the head H comprises a hollow metal insert 10 having an axial bore 12 and an integral lateral boss 14. The upper end of the bore 12 is enlarged and threaded as at 16, and the boss 14 is drilled to form a gas inlet passage 17 opening into the threaded bore 16. A gas inlet connection 18 is permanently secured in the outer end of the passage 17.

The inside of the head insert 10 is cored on each side of the bore 12 to form longitudinal grooves 19 and 20 below the threaded bore 16. The lower portion of the outside of the head insert 10 is externally threaded as at 21, below which is cut an annular groove 23 connecting the lower ends of the grooves 19 but leaving depending abutments 25 therebetween.

As shown in Figs. 1 and 4, the head insert 10 is drilled through the boss 14 below the gas inlet passage 17, forming straight passages 24 respectively opening into the grooves 19 and 20. A cooling fluid or water inlet connection 26 is permanently secured in the outer end of one passage 24, and a water outlet connection 27 is permanently secured in the outer end of the other passage 24. The connections 18, 26 and 27 are preferably of bronze, and preferably secured in the boss 14 by silver solder.

The insert 10 and the connections secured in its boss have a plastic cast therearound to form an insulating cover 30 for the head H and shank S. The plastic is preferably nylon, and the head insert 10 is preferably of tobin bronze for strength to resist the high molding pressure, and still have high heat and electrical conductivity.

The hand grip G is a tube of plastic insulation threaded onto the shank S, and readily removable to facilitate detachable connection of the torch to sources of welding current, shielding gas and cooling medium. The gas connection 18 is coupled to a flexible shielding gas supply hose 28. The water inlet connection 26 is coupled to a flexible water inlet hose 29. The water outlet connection 27 is coupled to a flexible water outlet hose 32, which contains a flexible electrical conductor 33. The conductor 33 is automatically electrically connected to the metal water outlet tube 27 when the coupling is made, to supply the electric welding current to the metal torch head insert 10. The hoses 28, 29 and 32 are threaded through the hand grip G before the couplings are connected, and thereafter the grip G is slid along over the same and screwed onto the shank S thus covering all the completed couplings.

The electrode holder or barrel B is preferably of copper, and comprises a cylindrical sleeve portion 35, which slidably fits into the bore 12, and a collar 36 which abuts the lower end of the insert 10. The upper end of the sleeve 35 engages an O-ring 37 filled in a groove 38 below the threaded bore 16 above the tops of the grooves 19 and 20, and squeezes the inner side of the O-ring 37 into detachable sealing engagement therewith.

The lower portion of the barrel B below the collar 36 has an internal conical seat 42 which receives an external conical split end 44 of the collet C fitting in the bore of the sleeve 35. Above the seat 42 and below the collar 36 the holder B has radial gas apertures 43. The collet C is preferably of steel, and extends up beyond the top of the sleeve 35, terminating in an enlarged head 46.

Threaded in the top of the bore 16 is an electrode cap 48 having an annular seat 50 engaging the collet head 46, and forcing it down to cause the split end 44 to engage the seat 42 and contract to grip the electrode E. The electrode cap 48 comprises a bronze insert and a plastic covering, the metal insert having an external groove receiving an O-ring 52 sealing the joint between the cap 48 and the head H.

The lower side of the collar 36 on the electrode holder B abuts against a sealing gasket 54 preferably composed of layers of synthetic rubber cemented to thermosetting plastic. This gasket rests on an internal annular shoulder 56 in a bronze water jacket 57, which is threaded onto a plastic insulating sleeve 58, in turn threaded onto the threaded portion 21 of the torch head insert. The upper end of the insulating sleeve 58 abuts the torch head insulating cover 30, and has an internal annular groove receiving an O-ring 59 sealing against the torch head insert 10. The upper end of the jacket 57 has an internal annular groove receiving an O-ring 60 sealing against the insulating sleeve 58. The nozzle N is preferably of copper, threaded onto the lower end of the water jacket 57.

In assembling the torch, the O-ring 59 is passed over the threaded portion 21 of the torch head insert, followed by the insulating sleeve 58, which is screwed onto the lower end 21 of the torch head insert 10 compressing the O-ring 59. These parts remain in relatively permanent position as parts of the torch head H.

The electrode holder B is inserted in the torch head H, the top of the sleeve 35 passing through the O-ring 37 and squeezing it into sealing relation. The water jacket 57 is screwed onto the insulating sleeve 58, which causes the shoulder 56 to compress the gasket 54, and force the top of the collar 36 against the depending abutments 25 on the torch head insert 10.

The nozzle N is screwed onto the water jacket 57 and collet 45 is inserted through the top of the torch head into the bore of the electrode holder sleeve 35, with the conical bottom 44 of the collet engaging the internal seat 42 in the holder B. The electrode cap 48 is screwed into the head insert bore 16, and the cap seat 50 engages the head 46 of the collet. The electrode E is inserted through the nozzle N, conical seat 42 of holder B, and the collet end 44 into adjusted position, after which the cap nut 48 is tightened to cause the collet to grip the electrode and hold it in position.

In operation, electric welding current passes from the cable 33 through the metal water outlet connection 27, to the metal torch head insert 10. The abutments 25 depending from the insert 10 make electrical contact with the holder collar 36, so that the welding current passes from the insert 10 through the holder B, seat 42, jaws 44 to the electrode E.

Shielding gas passes from the gas inlet hose 28 to the gas inlet connection 18, through the passage 17 to the threaded bore 16, the top of which is closed by the electrode cap 48. From the bore 16 the gas flows down through the annular space between the collet 45 and holder sleeve 35, and out through the radial apertures 43 to the interior of the nozzle N. Cooling medium such as water passes from the water inlet hose 29 through water inlet connection 26 and one passage 24 to the longitudinal channel 20 from which the water passes to the annular water chamber W, formed by the bottom of the insulating sleeve 58, the outside of the collar 36, the top of the gasket 54, and the inner wall of the jacket 57. From the chamber W the water passes up through the channel 19, out through the other passage 24 and water outlet connection 27 to the water discharge hose 32. The collar 36 forms the greatest mass of copper in the electrode holder, and directly contacts the cooling medium in chamber W, for greatest heat conductivity and consequent efficient cooling.

The electrode cap 48 provides a quick release for the collet 45. A slight turn of the cap 48 takes pressure off the collet jaws 44 against the seat 42 and permits adjustment of the electrode. Removal of the cap 48 permits removal and replacement of the collet 45.

The water jacket 57 provides a quick take apart of the water system. Removal of the jacket 57 permits removal of the holder B and opens the chamber W for cleaning. Also this opens the through bore 12 of the head insert 10 for ready cleaning of the channels 19 and 20. The passages 24 open into this bore and are substantially aligned with the connections 26 and 27 so that wires can be passed therethrough for cleaning purposes.

In the form shown in Fig. 4, the electrode holder barrel 35 and collet 45 are of a size to receive a ¼ inch diameter tungsten electrode. The barrel 35 will also receive smaller collets graduated in sizes for 5⁄32 and 3⁄16 inch diameter tungsten electrodes.

In the form shown in Fig. 1 at the right hand side, the electrode holder barrel 39 is smaller, being adapted to receive smaller collets 40 graduated in sizes for 1⁄16, 3⁄32 and 1⁄8 inch diameter tungsten electrodes. Thus the two sizes of electrode holder each receive three sizes of collets for a range of six sizes of electrode.

In the torch thus described, the non-consumable electrode is rigidly secured inside the torch in adjusted position. The torch as shown in Fig. 5 is adapted for metal arc welding with a consumable electrode fed through the torch to deposit weld metal on the work. For this purpose, in place of the electrode E the torch is provided with a separable guide tube portion or contactor tube 62 of copper, which is gripped by the collet jaws 44, and extends a short distance in each direction inward and outward therefrom. Electrode guiding means such as a guide tube adaptor 64 is fitted inside the collet, to extend above the contactor tube 62, with their bores aligned. The top of the adaptor 64 is provided with an enlarged head 65 forming an annular shoulder 66 which rests on the head of the collet.

In place of the cap 48, a collet release nut 68 is screwed into the threaded bore 16, and is provided with an annular groove to receive the O-ring 52. The nut 68 rotatably receives a coupling 69 for a flexible wire guide tube 70 which aligns with the bore in the guide tube adaptor 64. A snap ring 72 retains the coupling 69 in longitudinal position while permitting rotation of the release nut 68 relative thereto. The nut 68 has a bore 73 which slidably and rotatably receives the head 65 of the guide tube adaptor. The bottom of the coupling 69 bears on the top of the adaptor head 65, which in turn bears on the collet head 46.

The guide tube adaptor 64 is located above the water jacket 57 and is thereby protected from the heat of the arc. The contactor tube 62 extends beyond the water jacket to guide the wire toward the arc, and is not protected from the arc heat, so that it requires renewal from time to time. Turning the nut 68 takes pressure off the adaptor head 65 and collet head 46 to release the collet jaws. The contactor tube 62 is removed and replaced by a new one through the nozzle N and seat 42. The adaptor head 65 is retained in position by the collet head 46, during the removal and replacement of the contactor tube 62.

In the form shown in Fig. 5, the same electrode holder barrel 35 and collet 45, which are of a size to receive a ¼ inch diameter tungsten electrode, are employed for all sizes of electrode wire. The contactor tube 62 and adaptor 64 are interchangeable with others of the same outside diameter but of graded internal diameters for 1/32, 3/64, 1/16 and 5/32 inch diameter wire.

Assuming that the torch as shown in the right hand side of Fig. 1 is assembled for tungsten arc welding with a 3/32 inch diameter electrode, and it is desired to convert the same for metal arc welding with a 1/16 inch diameter aluminum wire, the procedure is as follows:

The electrode cap 48 is removed, and the 3/32 inch collet 40 is taken out. The water jacket 57 is removed, and the smaller electrode holder with the barrel 39 (1/16, 3/32 and 1/8 inch) replaced by the larger electrode holder with the barrel 35 (5/32, 3/16 and 1/4 inch) after which the water jacket is replaced.

The larger collet 45 (1/4 inch) is inserted in the larger holder barrel 35 from the top, and the adaptor 64 (1/16 inch) is inserted from the top into the larger collet. The contactor tube 62 is inserted through the lower end of the collet until it abuts the lower end of the adaptor 64. The collet nut 68 is inserted and screwed down until the coupling 69 engages the adaptor head 65, which bearing on the collet head 46 tightens the collet jaws to grip the contactor 62.

The other end of the flexible guide tube 70 is connected to a suitable wire feed mechanism not shown. The wire is threaded from the guide tube 70 and coupling 69 through the adaptor 64 and contact tube 62. Welding current passes from the holder and collet to the contact tube 62 which supplies the current to the moving electrode wire.

The torch as thus described whether adapted for tungsten arc or metal arc welding, may be assembled for hand operation as shown in Fig. 3, or it may be mounted for mechanized or carriage propelled operation as shown in Fig. 2. For the latter purpose, the insulating cover 30 is provided with a cylindrical portion 75 between the lateral boss 14 and the threaded portion 21. This portion 75 is adapted to be received in a clamp 76 mounted in offset relation at the bottom of a tube 77 provided with a rack 78, adapted to enter the conventional blowpipe racking sleeve of a cutting machine carriage not shown. To minimize projections, the hand grip G may be replaced by a shorter sleeve 79.

We claim:

1. In a gas shielded arc welding torch, a hollow current and gas supplying head, an electrode holder in said head, a gas directing nozzle adjacent the lower end of said holder, said holder having a continuous gas passage from the interior of said head to the interior of said nozzle, a collet in said holder, an electrode contactor tube gripped by said collet and extending down inside said nozzle, and an electrode guide means in said holder above said contactor tube, said guide means and said contactor tube being in axial alignment for guiding a metal depositing electrode wire through the torch and out through said electrode contactor tube inside said nozzle, said contactor tube being separably removable for repair or replacement when said collet is relaxed from tube gripping engagement.

2. In a gas shielded arc welding torch, a hollow current and gas supplying head, an electrode holder in said head having a bore and an internal conical seat, a collet in said bore having jaws engaging said seat, a collet nut threaded on said holder for urging said collet jaws against said seat, an electrode contactor tube gripped by said collet jaws, an electrode guide tube in said holder between said collet nut and said contactor tube, said contactor tube being separably removable for repair or replacement when said collet jaws are released from gripping engagement, means for supporting a gas directing nozzle adjacent the lower end of said holder, said holder having a continuous gas passage from the interior of said head to the interior of said nozzle.

3. In a gas shielded arc welding torch, a hollow current and gas supplying head, an electrode holder in said head, a collet in said holder, a collet nut on said holder, an electrode contactor tube gripped by said collet, a flexible wire supplying cable coupling in said collet nut, an electrode guide tube in said holder between said collet nut and said contactor tube, said contactor tube being separably removable when said collet is released from gripping engagement, means for supporting a gas directing nozzle adjacent the lower end of said holder, said holder having a continuous gas passage from the interior of said head to the interior of said nozzle.

4. In a gas shielded arc welding torch, a hollow current and gas supplying head, an electrode holder in said head, means forming a cooling chamber between said holder and said head, an electrode guide tube having a relatively permanent portion mounted in said head above said cooling chamber, a gas directing nozzle mounted adjacent said cooling chamber, a collet in said holder and an electrode contactor tube gripped by said collet aligned with said permanent tube and extending below said cooling chamber and through said nozzle said contactor tube being separably removable when said collet is released from gripping engagement.

5. In a gas shielded arc welding torch, a hollow current and gas supplying head having a lateral passage with an inlet into the hollow of said head, an electrode holder in said head and extending above said passage inlet, a collet in said holder, an electrode contactor tube gripped by said collet, an electrode guide means in said holder above said contactor tube, said guide means and said contactor tube being in axial alignment and said contactor tube being separably removable when said collet is released from gripping engagement, and means for supporting a gas directing nozzle adjacent the lower end of said holder, said holder having a continuous gas passage from the interior of said head to the interior of said nozzle.

6. In a gas shielded arc welding torch, a hollow current and gas supplying head having a lateral passage with an inlet into the hollow of said head, an electrode holder removably inserted in said head and extending above said passage inlet, means for detachably sealing said holder in said head to form a cooling chamber therebetween, said holder having an internal conical seat below said cooling chamber, a collet in said holder engaging said seat and extending above said holder, an electrode contactor tube gripped by said collet, a collet engaging cap threaded in the upper end of the hollow of said head engaging the top of said collet to clamp said collet against said seat, an electrode guide tube in said holder between said collet nut and said contactor tube, said contactor tube being separably removable when said collet is relaxed from gripping engagement, and means for supporting a gas directing nozzle below said cooling chamber, said holder having a continuous gas passage from the interior of said head to the interior of said nozzle.

References Cited in the file of this patent

UNITED STATES PATENTS

| | | |
|---|---|---|
| 2,014,226 | Catlett | Sept. 10, 1935 |
| 2,381,355 | Laughton | Aug. 7, 1945 |
| 2,512,705 | Anderson | June 27, 1950 |
| 2,512,706 | Anderson | June 27, 1950 |
| 2,512,707 | Anderson | June 27, 1950 |
| 2,527,235 | Tuthill et al. | Oct. 24, 1950 |
| 2,544,801 | Muller | Mar. 13, 1951 |
| 2,659,797 | Anderson | Nov. 17, 1953 |